United States Patent [19]

Westbrock

[11] Patent Number: 4,924,972
[45] Date of Patent: May 15, 1990

[54] PORTABLE TREE SEAT

[75] Inventor: Jerry B. Westbrock, White Bear Lake, Minn.

[73] Assignee: Melvin J. Konietzki, Nekoosa, Wis.

[21] Appl. No.: 403,114

[22] Filed: Aug. 31, 1989

[51] Int. Cl.⁵ ............................ A45F 3/26; A47C 9/10
[52] U.S. Cl. ..................................... 182/187; 108/152
[58] Field of Search ................ 182/187, 188; 108/152

[56] References Cited

U.S. PATENT DOCUMENTS

| | | |
|---|---|---|
| 1,131,540 | 3/1915 | Nerenhausen .................... 182/188 |
| 2,711,783 | 6/1955 | Prill . |
| 2,855,980 | 10/1958 | Konieczka . |
| 3,115,213 | 12/1963 | Cloutier . |
| 3,353,629 | 11/1967 | Brunes . |
| 3,493,080 | 2/1970 | Ehlert et al. . |
| 3,730,294 | 5/1973 | Thurmond . |
| 3,749,200 | 7/1973 | Meyer . |
| 3,927,733 | 12/1975 | Wurn et al. . |
| 3,990,537 | 11/1976 | Swenson ........................... 182/187 |
| 4,113,057 | 9/1978 | Bessinger . |
| 4,113,058 | 9/1978 | Kobosh . |
| 4,129,198 | 12/1978 | Hunter ............................... 182/187 |
| 4,484,660 | 11/1984 | Baynum . |
| 4,625,833 | 12/1986 | Lewis . |
| 4,691,804 | 9/1987 | Bunker ............................... 182/187 |
| 4,721,183 | 1/1988 | Koniecka . |
| 4,730,699 | 3/1988 | Threlkeld .......................... 182/187 |

Primary Examiner—Reinaldo P. Machado
Attorney, Agent, or Firm—Lathrop & Clark

[57] ABSTRACT

A portable tree seat has a flat rectangular frame with portions defining a longitudinal slot and an intersecting lateral slot. A brace formed of two bent rods joined by a triangular plate spike is rotatably mounted on the frame. A conical screw-ridged stud is affixed to the front of the frame and is adapted to be embedded in a tree trunk. A generally flat platform of rectangular plan is slidably mounted on the frame by a fastener running in the longitudinal and lateral slots. In the stored position the platform is parallel to and overlies the frame. In the extended position, the platform is perpendicular to the frame and serves as a seat.

4 Claims, 2 Drawing Sheets

PORTABLE TREE SEAT

FIELD OF THE INVENTION

This invention pertains generally to the field of portable seats and stands and particularly those adapted to mount to a vertical post or column structure, including trees.

BACKGROUND OF THE INVENTION

A wide variety of portable tree seats or stands are known and currently used. Outdoorsman such as campers, naturalists, and hunters carry tree seats into wooded areas and can mount the seat to a tree at a suitable height. Tree seats are often mounted at a high elevation on a tree to give the outdoorsman a wide field of view while at the same time shielding him from observation by forest wildlife. Tree seats are also used to provide comfortable and convenient seating at normal chair height.

The structure typically employed by a portable tree seat to support the weight of a user is that of a collapsible triangular truss. One leg of this truss is formed by the tree trunk, a second leg is formed by a seating platform rigidly affixed to the tree trunk by ropes, screws, buckles, or other fasteners, and the third leg of the truss formed by an angled brace running from the seating platform to the tree trunk at a spot below the joint of the platform to the tree trunk.

In order to provide comfortable seating, the platform must be both wide enough for the user's seat and extend outwardly from the tree far enough so that the user has a secure perch on the seat. The best range for both these distances is 9 to 12 inches.

A seating platform of these dimensions will tend to be bulky and heavy. Prior art tree seats have alleviated these problems by utilizing flexible fabric seats on frames as in U.S. Pat. Nos. 3,927,733 and 3,730,294. Another approach is to reduce the weight of a rigid platform by piercing it with holes as in U.S. Pat. No. 3,749,200. However, the pierced platforms are not any less bulky, and the fabric-on-frame platforms, while compact, require many manufacturing operations to produce.

SUMMARY OF THE INVENTION

The tree seat of the present invention has a seating platform slidably mounted on the support structure of the tree seat so that the tree seat may be collapsed into a slim, lightweight assembly for transport, yet rapidly extended to suitable dimensions for seating and readily and easily mounted at the desired elevation on a tree.

The tree seat has a seating platform formed of a solid material, e.g., wood, having a fastener mounted at its center and running in a T-shaped slot in a metallic frame. The frame has a brace rotatably mounted on its underside with a spike at the far end of the brace to engage the tree and a screw mounted to the frame to permit the seat to be screwed into a tree trunk at the desired elevation. In the stored, transportable configuration, the platform overlies and is parallel to the frame and the tree seat is narrow enough to permit the tree seat to be carried in a pocket or backpack. When the frame is mounted to a tree, the platform is moved outward along the stem of the T-shaped slot, rotated 90° and locked in place by the cross of the T-shaped slot. The platform is then perpendicular to the brace and provides a wide seating area.

Further objects, features, and advantages of the invention will be apparent from the following detailed description when taken in conjunction with the accompanying drawings.

DETAILED DESCRIPTION OF THE INVENTION

Figure 1:
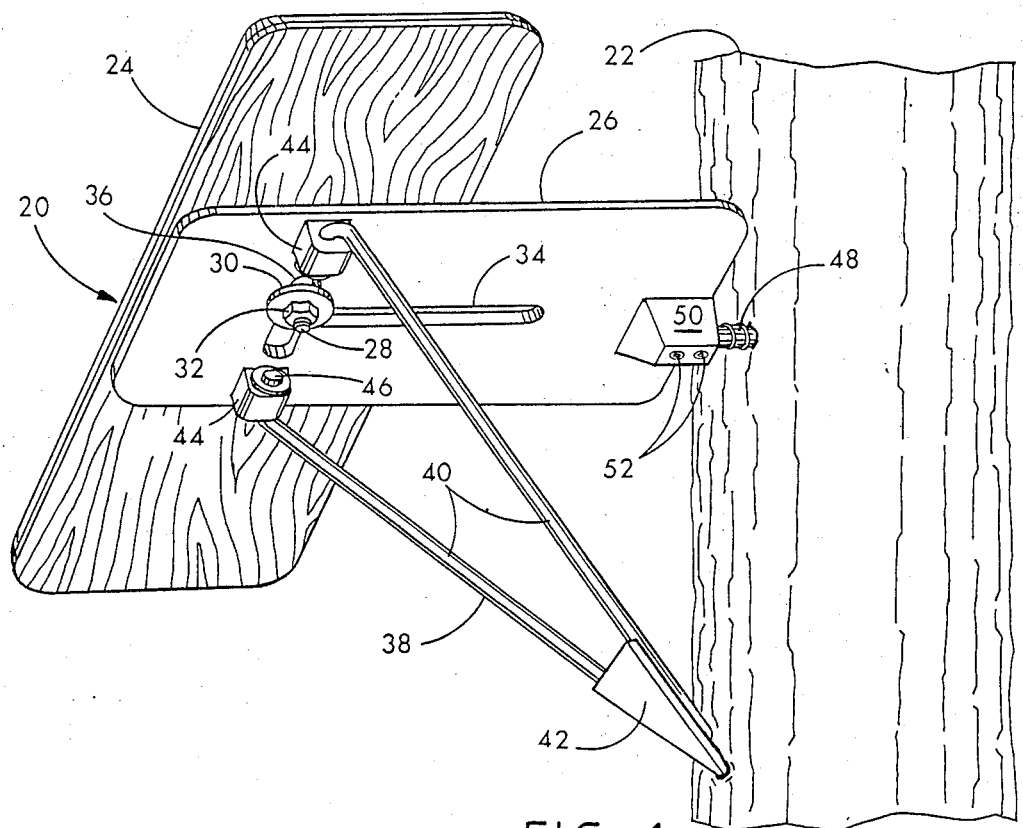
FIG. 1 is a perspective view showing the tree seat of the invention mounted on the tree.

With reference to the drawings, a preferred embodiment of a portable tree seat in accordance with the present invention is shown generally at 20 in FIG. 1 mounted to a tree trunk 22. The tree seat 20 includes a generally flat platform 24, having flat top and bottom surfaces. The platform 24 is preferably formed of a strong, relatively lightweight material, such as various sturdy grades of wood. The platform 24 is generally rectangular as seen in FIG. 3 with preferably rounded corners to reduce splintering.

The platform 24 is joined to a frame 26 by a fastener 28, such as a one inch lag bolt and held in place by a washer 30 and lock nut 32. The fastener 28 moves freely in a T-shaped slot made up of a longitudinal slot 34 and a lateral slot 36 in the frame 26. The lateral slot 36 intersects the end of the longitudinal slot 34 which is furthest from the end of the frame which will mount to a tree or post. The lock nut 32 is fixed to the fastener 28 by glue, welding, or other adhesive means so that the fastener is free to move in the slots 34, 36. The frame 26 is constructed of a sturdy metallic material such as steel, or brass, but for lower weight is preferably constructed of aluminum. A brace 38 is formed of two bent rods 40 joined to a triangular plate spike 42. The brace 38 is rotatably mounted on the frame 26 with the bent ends of the two rods 40 carried in bearings 44 on either side of the lateral slot 36. The rods 40 are retained in the bearings 44 by pal caps 46. On the trunk side of the brace 38 is a stud 48, preferably formed from hardened steel. The stud 48 is conical with spiral screw ridges and is inserted into the stud grip 50 and held in place by two spring pins 52 driven through the stud grip 50 and the stud 48. The stud 48 permits the selective and releasable mounting of the tree seat 20 on a tree.

Figure 2:
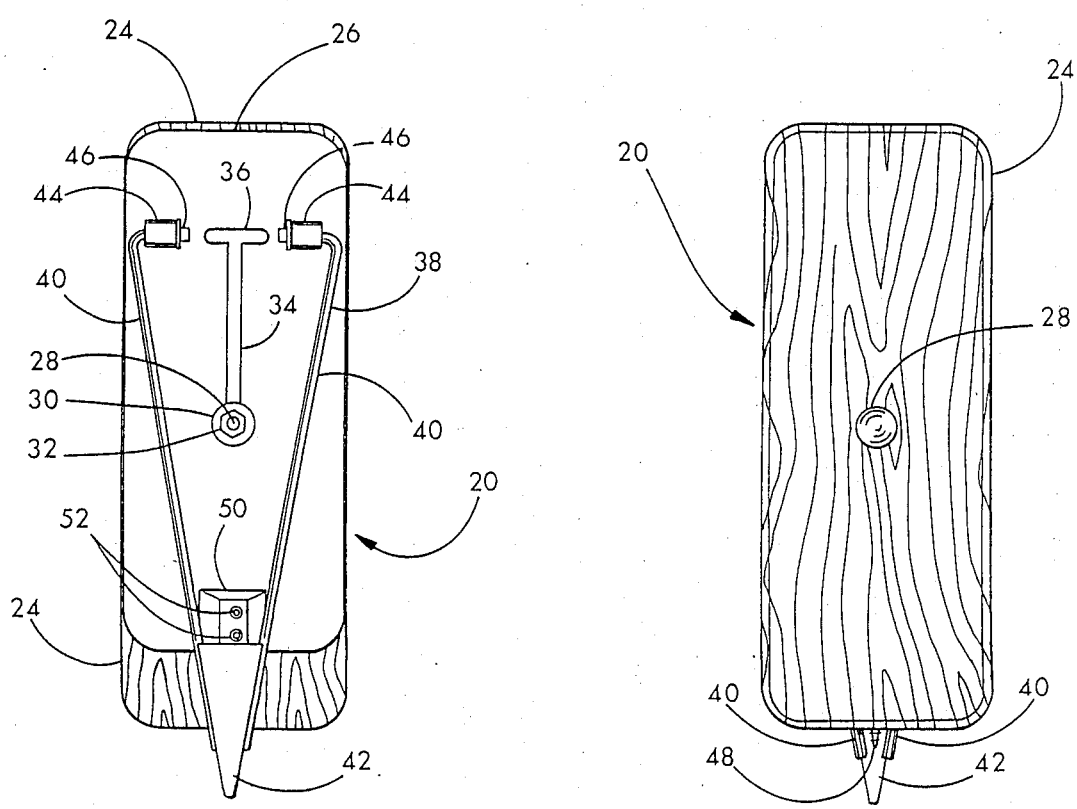
FIG. 2 is a bottom view of the tree seat shown in its stored position for carrying.
Figure 3:
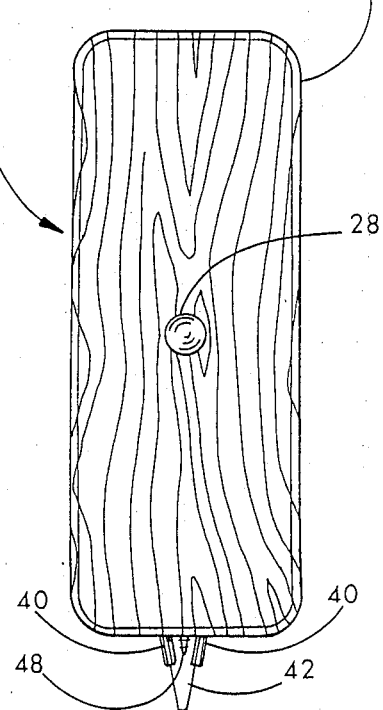
FIG. 3 is a top view of a tree seat as in FIG. 2.
Figure 4:
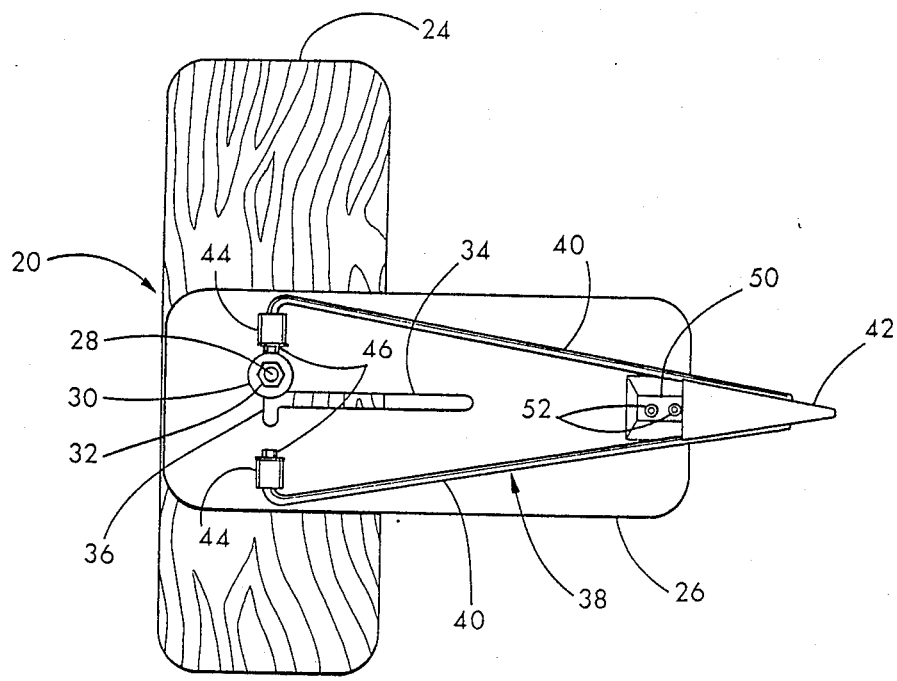
FIG. 4 is a bottom view of a tree seat with the platform in extended position prior to mounting on a tree.
Figure 5:
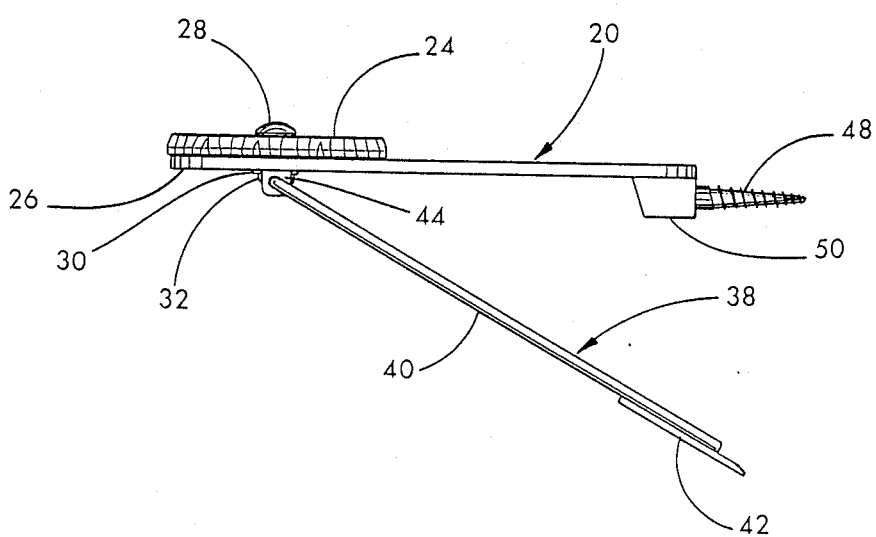
FIG. 5 is a side view of the tree seat of FIG. 4.

FIGS. 2 and 3 show the tree seat 20 in its stored position for carrying. The platform 24 overlies and is parallel to the frame 26. In this position the tree seat may be easily transported in the pocket of a jacket or even in a back trousers pocket.

When it is desired to mount the tree seat 20 in the trunk 22 of a tree, the brace 38 is rotated away from the tree to present the unobstructed stud 48. The platform 24 is withdrawn from its position overlying the stud by sliding the platform 24 and fastener 28 backwards in the longitudinal slot 34. The stud 48 is then pressed against the bark of the tree trunk 22 and rotated until the full extension of the stud 48 is embedded in the trunk 22. This rotation may be facilitated by turning the platform 24 in the longitudinal slot 34 until the platform 24 is perpendicular to the frame 26. Greater leverage can then be exerted in turning the stud.

Once the stud 48 is fully embedded in the trunk 22 the brace 38 is rotated back towards the trunk 22 and the spike 42 on the ends of the rods 40 is driven into the trunk 22 by hand pressure. The tree seat 20 is then rigidly affixed to the trunk 22.

The platform 24 is then placed in its extended position perpendicular to the brace 38 and the fastener 28 may then slide laterally in the lateral slot 36. The walls of the lateral slot 36 engage the fastener 28 to inhibit the platform from sliding longitudinally. The user may then seat himself comfortably on the platform 24.

The tree seat 20 may be released from the trunk 22 by simply unscrewing it and withdrawing it from the trunk. It may then be transported to a different tree for repeated mounting if desired.

It should be noted that other means of selectively and releasably mounting the tree seat to the trunk may be employed in the tree seat of this invention, for example, by means of chains, belts, pins, straps or pegs. Furthermore, the brace can take the form of a solid plate or other bracing structure and can be mounted at other positions using different bearings than those described in the preferred embodiment. Additionally, the frame and brace can be constructed of high strength plastics, carbon fiber composite materials, or any sufficiently sturdy material. Likewise, the platform need not be constructed of wood, but may be constructed of a suitable plastic, metal or composite material.

It is understood that the invention is not confined to the particular construction and arrangement of parts herein illustrated and described, but embraces such modified forms thereof as come within the scope of the following claims.

What is claimed is:
1. A portable tree seat comprising:
  (a) a frame having portions defining a longitudinal slot;
  (b) a brace rotatably mounted on the frame;
  (c) a fastener adapted to fit within the longitudinal slot of the frame;
  (d) mounting means for selectively and releasably mounting one end of the frame to a vertical structure such as a tree;
  (e) a platform slidably mounted on the frame by the fastener in the slot whereby the platform may slide over the frame from a stored position parallel to and overlying the frame to an extended position perpendicular to the frame.
2. The portable tree seat of claim 1 wherein the frame further includes a lateral slot intersecting an end of the longitudinal slot such that the fastener can slide from the longitudinal slot to the lateral slot where it will hold the platform to inhibit longitudinal motion of the platform.
3. The portable tree seat of claim 1 wherein the mounting means comprises a conical screw-ridged stud affixed to the frame.
4. The portable tree seat of claim 1 further comprising a spike affixed to the brace in a position such that the spike can engage a vertical structure such as a tree.

* * * * *